United States Patent
Esaki et al.

(10) Patent No.: US 7,363,855 B2
(45) Date of Patent: Apr. 29, 2008

(54) PROCESS PROGRESS DISPLAY DEVICE

(75) Inventors: Yasuhiro Esaki, Ibaraki-ken (JP); Takayuki Tokozume, Ibaraki-ken (JP); Mayumi Furukawa, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 37 days.

(21) Appl. No.: 10/782,767

(22) Filed: Feb. 23, 2004

(65) Prior Publication Data
US 2004/0168587 A1    Sep. 2, 2004

(30) Foreign Application Priority Data
Feb. 28, 2003   (JP) ............................. 2003-053529

(51) Int. Cl.
*B41F 15/04* (2006.01)
(52) U.S. Cl. ...................... 101/129; 101/115; 101/116; 101/128.4
(58) Field of Classification Search ................. 101/114, 101/115, 116, 121, 128.4, 129
See application file for complete search history.

(56) References Cited

U.S. PATENT DOCUMENTS

| | | | |
|---|---|---|---|
| 4,842,266 A * | 6/1989 | Sweeney et al. .............. 482/54 |
| 5,305,238 A * | 4/1994 | Starr et al. .................... 702/176 |
| 5,740,731 A | 4/1998 | Kagawa |
| 6,161,476 A * | 12/2000 | Yoneoka ...................... 101/118 |
| 6,401,606 B1 * | 6/2002 | Sato ............................ 101/118 |
| 2002/0029703 A1 * | 3/2002 | Kubota et al. ............... 101/115 |
| 2002/0035935 A1 * | 3/2002 | Kaneda et al. ............ 101/128.4 |
| 2003/0094107 A1 * | 5/2003 | Asai et al. ................... 101/118 |
| 2003/0121431 A1 * | 7/2003 | Ohno ........................ 101/128.4 |
| 2003/0127001 A1 * | 7/2003 | Kanno ........................ 101/116 |

FOREIGN PATENT DOCUMENTS

| EP | 0 382 279 A2 | 8/1990 |
| FR | 2 672 452 A1 | 8/1992 |
| GB | 2 262 820 A | 6/1993 |

* cited by examiner

*Primary Examiner*—Ren Yan
*Assistant Examiner*—Kevin D. Williams
(74) *Attorney, Agent, or Firm*—The Nath Law Group; Jerald L. Meyer; Jonathan A. Kidney

(57) ABSTRACT

A process progress display device includes a stencil making block which displays a progress status of a stencil making process, a printing block which displays a progress status of a printing process, a stencil making stop bar which displays whether or not an entire process is to be stopped at an end of the stencil making process, and a printing stop bar which displays whether or not the entire process is to be stopped at an end of the printing process.

17 Claims, 11 Drawing Sheets

FIG.5

| No. | SUBPROCESS | DISPLAY |
|---|---|---|
| 1 | WHEN STENCIL MAKING KEY IS PRESSED | TURNING ON OF ALL OF M1 TO M4 (DISPLAY OF STENCIL MAKING ENABLED) |
| 2 | STENCIL DISCHARGE OPERATION | BLINKING OF M1 |
| 3 | STENCIL MAKING PREPARATION OPERATION | TURNING ON OF M1+BLINKING OF M2 |
| 4 | START OF STENCIL MAKING TO CUTTING OF STENCIL SHEET | TURNING ON OF M1 AND M2+BLINKING OF M3 |
| 5 | FIRST PRINTING | TURNING ON OF M1 TO M3+BLINKING OF M4 |

FIG.6

| No. | EVENT | DISPLAY |
|---|---|---|
| 1 | WHEN "PRINT" KEY IS PRESSED | TURNING ON OF ALL OF P1 TO P4 (DISPLAY OF PRINTING ENABLED) |
| 2 | FROM START OF PRINTING OPERATION TO END OF SHEET COUNT a | BLINKING OF P1 |
| 3 | TO END OF SHEET COUNT 2a | TURNING ON OF P1+BLINKING OF P2 |
| 4 | TO END OF SHEET COUNT 3a | TURNING ON OF P1 AND P2+BLINKING OF P3 |
| 5 | TO END OF SHEET COUNT 4a+b | TURNING ON OF P1 TO P3+BLINKING OF P4 |

TOTAL PRINTED SHEET NUMBER IS SET EQUAL TO 4a+b
(EXCEPTION) WHEN TOTAL PRINTED SHEET NUMBER IS 3 OR LESS

1 SHEET : APPLY NO.5
2 SHEETS : APPLY NO.3 TO FIRST SHEET ; AND APPLY NO.5 TO SECOND SHEET
3 SHEETS : APPLY NO.2 TO FIRST SHEET ; APPLY NO.3
TO SECOND SHEET ; AND APPLY NO.5 TO THIRD SHEET

PROCESS PROGRESS DISPLAY DEVICE

BACKGROUND OF THE INVENTION

1. Field of the Invention

The present invention relates to a process progress display device which displays a progress status of a plurality of work processes executed individually or continuously.

2. Description of the Related Art

Conventionally, in a processing apparatus which has a plurality of work processes and is capable of performing the work processes individually or continuously, it has been difficult to visually grasp to which work process the processing is to be performed.

For example, a conventional stencil printing machine which has a stencil making process and a printing process has been equipped with an LED of a display unit which displays execution of the stencil making process, an LED of a display unit which displays execution of the printing process, a key for switching the processing to the stencil making process, a key for switching the processing to the printing process, and a key for switching the processing to a process where the stencil making process and the printing process are performed continuously. In the stencil printing machine, a process currently set has been checked by how the LEDs are being turned on, and the processing has been switched to another process by a key operation.

As such a conventional stencil printing machine, for example, there is one described in Japanese Patent Laid-Open No. 2000-141851. The stencil printing machine described in this document is adapted to calculate an operating time from a point of time immediately after a stencil making operation is started to a point of time when a printing operation is completed, and to display the calculated operating time.

However, in such a stencil printing machine as described above, a relation between the stencil making process and the printing process, namely, such a relation indicating whether a setting is made to stop the processing after the stencil making process or after the printing process has not been visually displayed. Accordingly, it has been difficult for a user to understand an operation concept of stencil printing, such as how the respective processes are associated with one another, and to grasp an operation status of the stencil printing.

Moreover, a progress status of the stencil making process or printing process has not also been visually displayed. Accordingly, it has been difficult for the user to grasp the progress status. Furthermore, when the operation is stopped due to an occurrence of an error or the like at some midpoint in each of the processes, it has been impossible to visually grasp in which state each process is stopped.

In addition, though the printing machine has been adapted to be stopped in a standby state for a stencil making instruction or for a printing instruction in the case of receiving data of a printing original from a personal computer or the like, what is a clue to grasp the above-described state in the conventional stencil printing machine is only display states of the LEDs of the display units, which correspond to the I/F keys. Therefore, it has been difficult for the user to grasp the above-described state.

SUMMARY OF THE INVENTION

In this connection, the present invention has been created in consideration of the above. It is an object of the present invention to provide a process progress display device which facilitates visual grasping of a work process to be executed among a plurality of work processes and of a progress status of the work process, thus improving work efficiency.

In order to achieve the above-described object, the present invention provides a process progress display device displaying progress status of a plurality of work processes which are performed in a processing apparatus individually or continuously, the process progress display device comprising: a work process progress display unit configured to display a progress status of each work process; a work process stop display unit corresponding to each work process, making a display as to whether the processing apparatus is to be stopped or a work process scheduled to be subsequently performed is to be continuously executed in accordance with a work process to be executed at an end of the work process; and a control unit configured to control contents of the display of the work process progress display unit in accordance with the progress status of each work process and sequentially updates the contents of the display on the work process progress display unit.

In a preferred embodiment, the work process progress display unit and the work process stop display unit make a display in association with another display unit.

The another display unit may have a start key to start processing upon being pressed, the lighting start key indicates that it is possible to start the processing displayed on the work process progress display unit and the work process stop display unit, the blinking start key indicates that a start command for the processing is required, and the un-lighting start key indicates that it is impossible to start the processing.

The process progress display device may be included in a stencil printing machine including a stencil making process of perforating a stencil sheet based on image information and a printing process of performing stencil printing on a printing medium by use of the stencil sheet for which the stencil making has already been performed, and displays the progress statuses of the stencil making process and the printing process.

The stencil printing machine may include a plurality of printing drums, and performs the stencil printing independently for each of the printing drums, and the process progress display device displays the progress statuses of the stencil making process and the printing process for each of the printing drums.

The process progress display device may be included in an image forming apparatus including a developing process of developing and storing data received from outside and a printing process of printing the data developed and stored in the developing process, and displays progress statuses of the developing process and the printing process.

As described above, according to the present invention, the process progress display device is adapted to display whether the processing apparatus is to be stopped or to be made to execute a work process scheduled to be subsequently performed at the end of the work process to be executed in accordance therewith, as well as to display the progress status of each work process. Therefore, in a flow of the plurality of work processes to be executed individually or continuously, it is made possible to easily recognize the progress status of the work processes and to which work process the processing is to be executed. In such a way, the operationality and work efficiency of the apparatus which executes the plurality of work processes can be improved.

BRIEF DESCRIPTION OF THE DRAWINGS

FIG. 5 is a table showing correspondences between stencil making processes and display examples.

FIG. 6 is a table showing correspondences between printing processes and display examples.

DETAILED DESCRIPTION OF THE PREFERRED EMBODIMENTS

Embodiments of the present invention will be described below based on the drawings.

Figure 1:
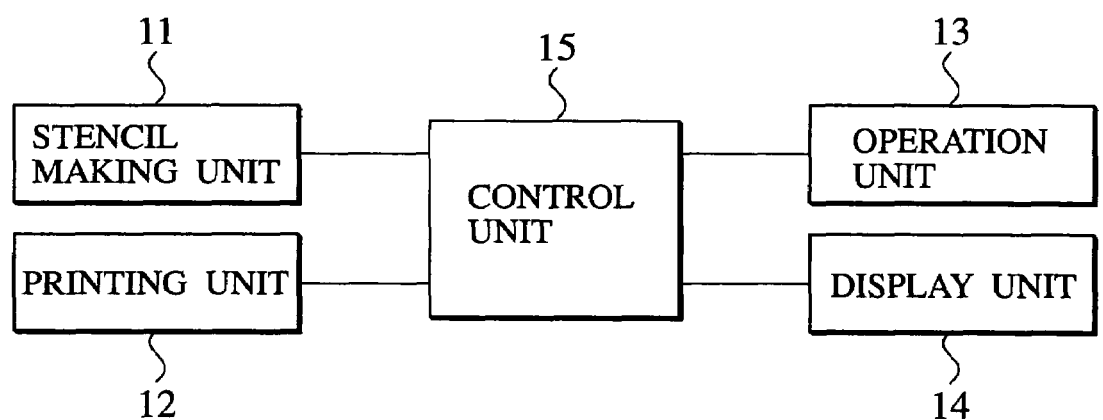
FIG. 1 is a view showing a configuration of a stencil printing machine when a process progress display device according to a first embodiment of the present invention is applied thereto.

FIG. 1 is a view showing a configuration of a stencil printing machine when a process progress display device according to a first embodiment of the present invention is applied thereto.

Prior to describing the process progress display device of the first embodiment, the stencil printing machine to which the process progress display device of the first embodiment is applied will be described with reference to FIG. 2.

Figure 2:
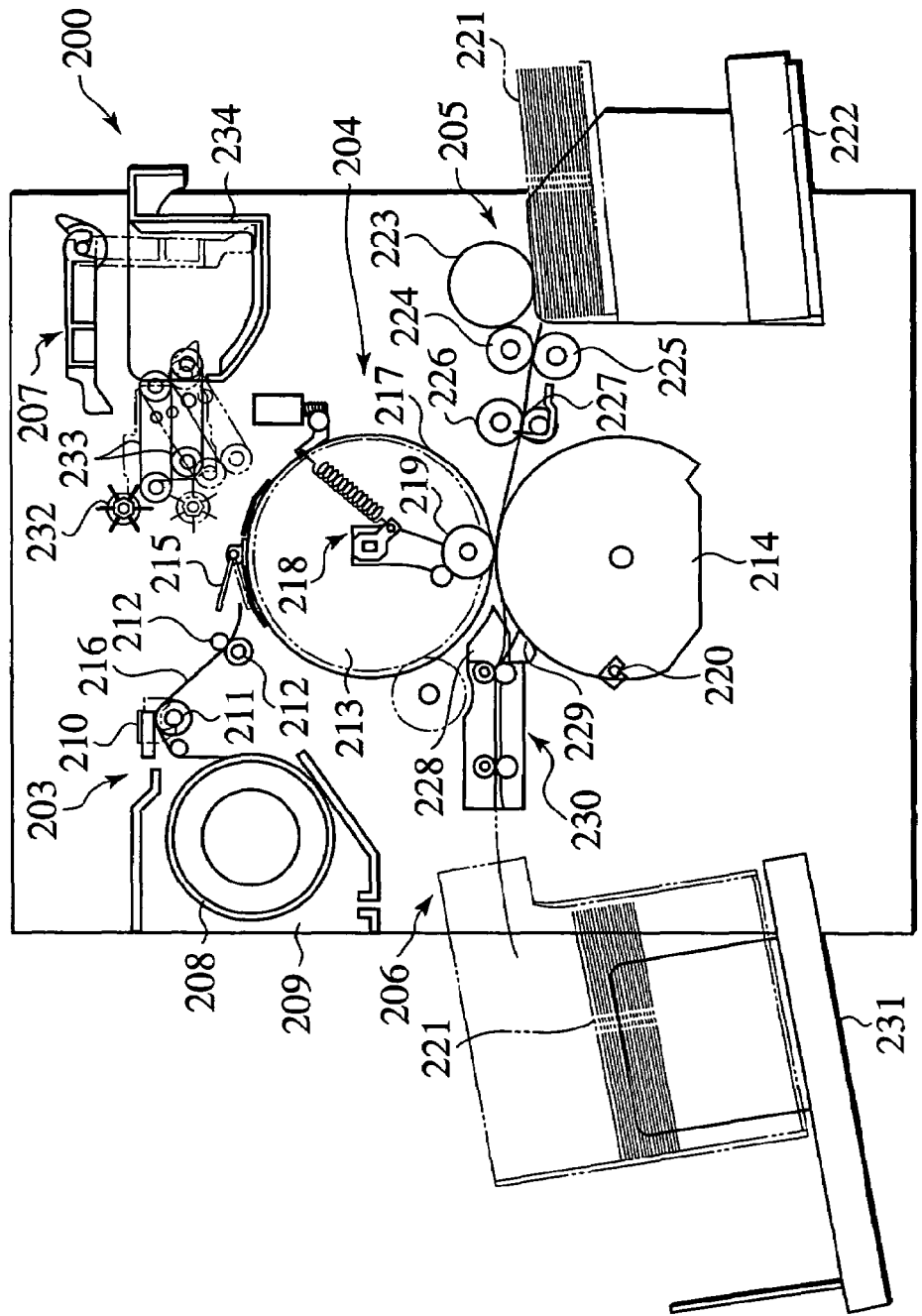
FIG. 2 is a view showing a configuration of the stencil printing machine to which the process progress display device of the first embodiment of the present invention is applied.

In FIG. 2, a stencil printing machine 200 is substantially configured of an original reading unit (not shown), a stencil making unit 203, a printing unit 204, a paper feed unit 205, a paper discharge unit 206, and a stencil discharge unit 207.

The original reading unit (not shown) is one that reads an original as an electric signal. Information made of this electric signal is configured so as to be processable based on a predetermined command (enlargement, reduction or the like).

The stencil making unit 203 is to perform stencil making for a long stencil sheet 208 based on the electric signal read by the original reading unit. The stencil making unit 203 includes a stencil sheet housing unit 209 which houses the rolled long stencil sheet 208, a thermal head 210 arranged downstream of the long stencil sheet 208 in a conveying direction, a platen roller 211 arranged opposite to the thermal head 210, a pair of stencil sheet feed rollers 212 arranged downstream of the long stencil sheet 208 in the loading direction, and a stencil sheet cutter (not shown) arranged between the pair of stencil sheet feed rollers 212 and the platen roller 211.

The printing unit 204 includes a printing drum 213 and a back press roller 214. The printing drum 213 and the back press roller 214 are provided so as to be freely rotatable individually while partially making outer peripheral surfaces thereof substantially close to each other. The printing drum 213 includes a pair of cylindrical flanges (not shown) provided opposite to each other at a predetermined interval. A stencil sheet clamp portion 215 is provided partially on outer peripheral surfaces of the flanges. The stencil sheet clamp portion 215 clamps a tip of a stencil sheet 216.

Moreover, a flexible screen 217 which forms a peripheral wall of the printing drum 213 is provided in a tensioned state on the flanged outer peripheral surface of the printing drum 213 except the stencil sheet clamp portion 215. In an inside of the screen 217 of the printing drum 213, an inner press roller 219 of an inner press unit 218 is provided. Moreover, a print sheet clamp portion 220 is provided on a predetermined region on the outer peripheral surface of the back press roller 214. This print sheet clamp portion 220 clamps tips of print sheets 221 that are printing media.

The paper feed unit 205 includes a paper feed tray 222 on which the print sheets 221 that are printing media are stacked, a scraper 223 which is brought into pressure contact with the uppermost print sheet 221 in the paper feed tray 222, a pickup roller 224 and a stripper roller 225 which are arranged downstream of the scraper 223 and arranged in a state substantially close to each other, and a guide roller 226 and a timing roller 227 which are arranged downstream of the pickup roller 224 and the stripper roller 225 and arranged in a state substantially close to each other.

As for the print sheets 221 moved by a rotation of the scraper 223, only the uppermost print sheet 221 is allowed to be conveyed by the pickup roller 224 and the stripper roller 225. This one piece of print sheet 221 allowed to be conveyed is conveyed by rotations of the guide roller 226 and timing roller 227 in synchronization with a rotation of the back press roller 214.

The paper discharge unit 206 includes an upper regulation guide portion 228 which guides the tip of the print sheet 221 finished being printed, a print sheet removal hook 229 which removes the unremoved print sheet 221 from the back press roller 214, a print sheet conveyor unit 230 which conveys the print sheet 221 guided by the upper regulation guide portion 228 or removed by the print sheet removal hook 229, and a stacker unit 231 which is loaded with the print sheets 221 conveyed from the print sheet conveyor unit 230 in a stacked state.

The stencil discharge unit 207 includes a discharged stencil guide belt 232 which guides the tip of the stencil sheet 216 released from the stencil sheet clamp portion 215 of the printing drum 213, a pair of discharged stencil conveyor belts 233 which convey the stencil sheet 216 guided by the discharged stencil guide belt 232 while removing the stencil sheet 216 from the printing drum 213, and a stencil disposal box 234 which houses the stencil sheet 216 conveyed by the pair of discharged stencil conveyor belts 233.

Next, an operation of the above-described stencil printing machine 200 will be briefly described. In the stencil making unit 203, the long stencil sheet 208 is conveyed by the rotations of the platen roller 211 and stencil sheet feed rollers 212. Subsequently, heat elements of the thermal head 210 operate to generate heat selectively based on image information read by the original reading unit (not shown) to thermally perforate the long stencil sheet 208. Next, an area for one print, which is obtained by subjecting the long stencil sheet 208 to such stencil making, is attached onto the printing drum 213 and then cut by the stencil sheet cutter (not shown). Thus, the stencil sheet 216 is made.

In the printing unit 204, a tip of the long stencil sheet 208 made by the stencil making unit 203 is clamped by the stencil sheet clamp portion 215 of the printing drum 213. The printing drum 213 is rotated in such a clamping state, and the long stencil sheet 208 is wrapped around and attached onto the outer peripheral surface of the screen 217 which forms the peripheral wall of the printing drum 213.

In the paper feed unit 205, the print sheet 221 is conveyed in synchronization with the rotations of the printing drum 213 and back press roller 214. The print sheet 221 is conveyed toward between the printing drum 213 and the back press roller 214 in a state where the print sheet clamp portion 220 of the back press roller 214 clamps the tip of the print sheet 221.

Meanwhile, in the printing unit 204, the inner press roller 219 is set at a standby position except a time of printing, and the inner press roller 219 is arranged in a region spaced from the screen 217. At the time of printing, the inner press roller 219 is set at a pressing position, and the printing drum 213 is rotated. Then, the inner press roller 219 rotates on an inner peripheral surface of the screen 217 while pressing the inner peripheral surface of the screen 217. Ink is continuously supplied to an outer peripheral surface of the inner press roller 219, and therefore, the ink is transferred onto the screen 217 by the rotation of the inner press roller 219.

Moreover, by the pressing of the inner press roller 219, the screen 217 bulges outward and is brought into pressure contact with the back press roller 214. Subsequently, as described above, the print sheet 221 is conveyed from the paper feed unit 205 toward between the printing drum 213 and the back press roller 214, and the conveyed print sheet 221 is further conveyed while being pressed between the inner press roller 219 and the back press roller 214 together with the screen 217 and the stencil sheet 216.

In this pressing/conveying process, the ink is transferred from the perforated portions of the stencil sheet 216 onto the print sheet 221, and thus an image is printed. When the tip of the print sheet 221 passes the position of the inner press roller 219 and goes downstream thereof, the print sheet clamp portion 220 is allowed to release the print sheet 221.

In the paper discharge unit 206, the tip of the print sheet 221 is guided by the upper regulation guide portion 228. Alternatively, the tip of the print sheet 221 is removed from the back press roller 214 by the print sheet removal hook 229. Thereafter, the print sheet 221 is conveyed to the stacker unit 231 through the print sheet conveyor unit 230.

In the stencil discharge unit 207, when starting another stencil making, it is necessary to discharge the stencil sheet 216 used for the prior printing, which is wrapped around and attached onto the outer peripheral surface of the screen 217 of the printing drum 213. In this case, prior to attaching a newly made stencil sheet onto the outer peripheral surface of the peripheral wall of the printing drum 213, the used stencil sheet is released from the stencil sheet clamp portion 215 of the printing drum 213, the tip of the released stencil sheet 216 is guided by the discharged stencil guide belt 232 while rotating the printing drum 213, and the stencil sheet 216 is conveyed by the pair of discharged stencil conveyor belts 233. Thus, the used stencil sheet is housed in the stencil disposal box 234.

Returning to FIG. 1, the stencil printing machine to which the process progress display device of the first embodiment is applied is configured by including a stencil printing unit 11, a printing unit 12, an operation unit 13, a display unit 14, and a control unit 15. The stencil printing unit 11 and the printing unit 12 are configured and operate as shown in FIG. 2, in which the stencil for the original to be printed is made, and printing is performed by means of the made stencil.

The control unit 15 is configured of a microcomputer which performs operation/processing based on a program, and serves as a control center for the stencil printing machine. The control unit 15 controls a variety of processes performed in the stencil printing machine, which includes a stencil making process, a printing process, and a display process becoming a feature of the first embodiment, based on the program prepared previously and stored in a storage device or the like.

Figure 3:
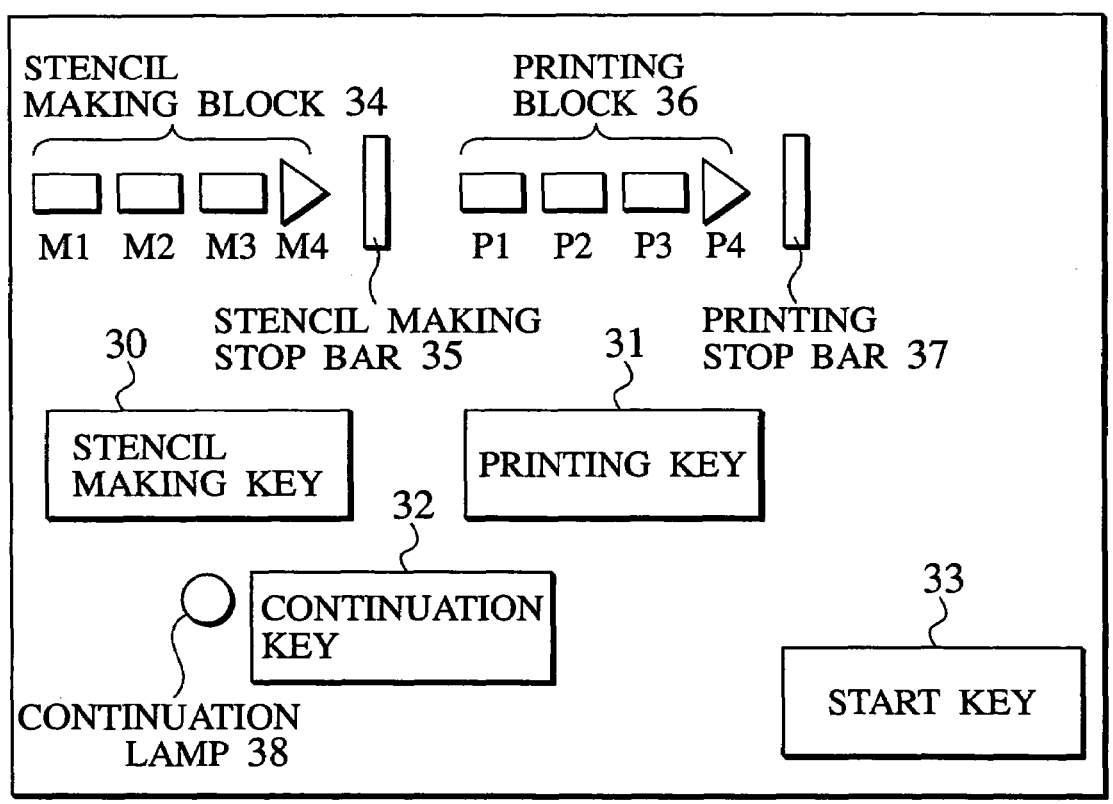
FIG. 3 is a view showing a configuration of an operation/display panel of the first embodiment of the present invention.

For example, as shown in a schematic view of FIG. 3, the operation unit 13 and the display unit 14 are integrally configured. In FIG. 3, the integrated operation unit 13 and display unit 14 include, as a configuration of the operation unit 13, a stencil making key 30, a printing key 31, a continuation key 32 and a start key 33, and as a configuration of the display unit 14, a stencil making block 34, a stencil making stop bar 35, a printing block 36, a printing stop bar 37, and a continuation lamp 38.

The start key 33 also functions as a constituent of the display unit 14 as well as a constituent of the operation unit 13, and for example, is configured of a self-illuminating LED. The lighting start key 33 indicates that it is possible to start a process displayed on the display unit 14. The blinking start key 33 indicates that a start command of the process is required. The un-lighting start key 33 indicates that it is not possible to start the process.

Figure 4:
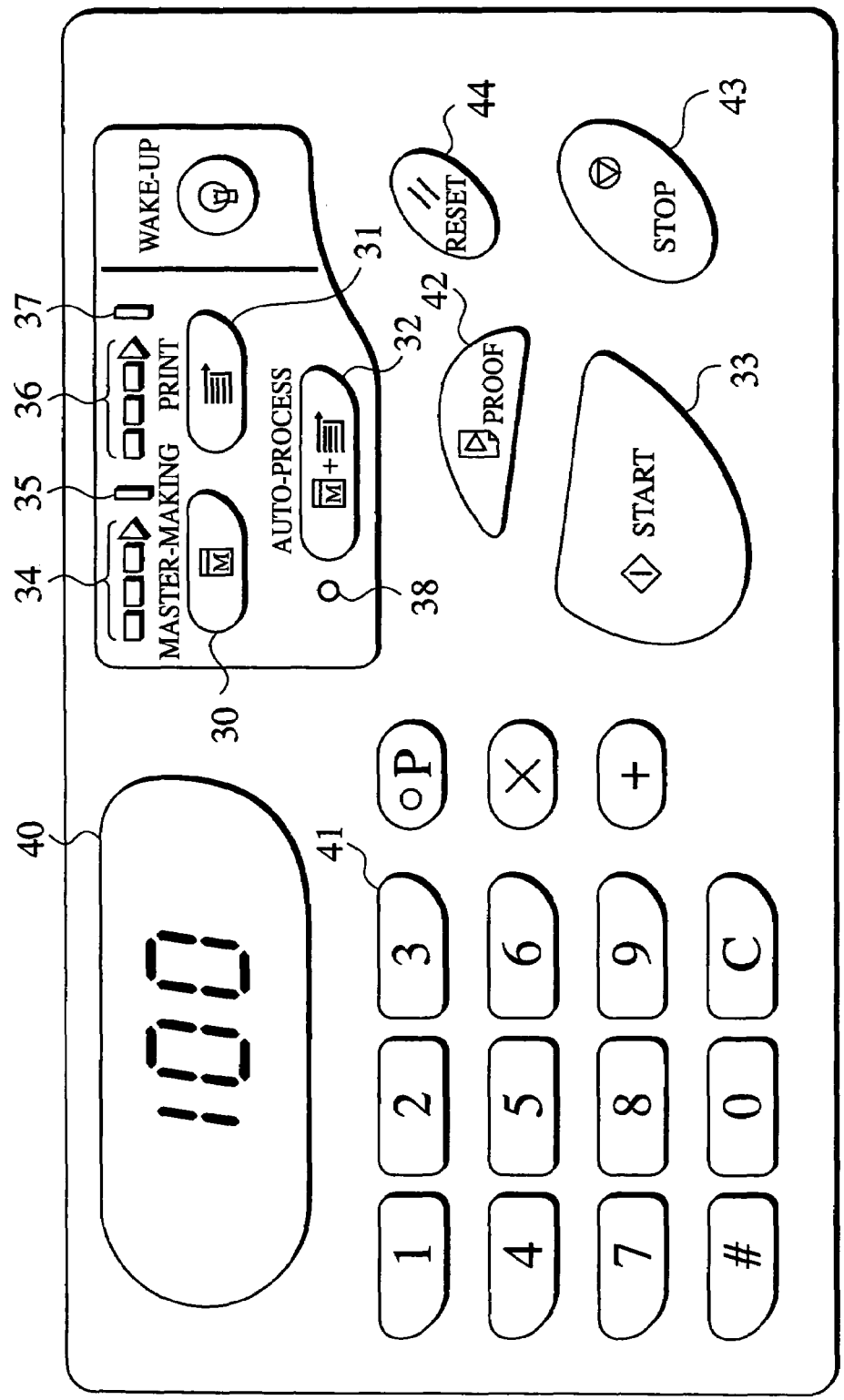
FIG. 4 is a view showing an entire configuration of the operation/display panel.

Note that an actual integrated operation unit 13 and display unit 14 are configured, for example, as shown in FIG. 4, and besides the constituents shown in FIG. 3, include a counter 40 which displays a numerical value of a printing number, a figure key 41, a trial print key 42 for use when performing trial print, a stop key 43, and a reset key 44.

In FIG. 3, the stencil making key 30 is a key which switches the processing to the stencil making process. When the stencil making key 30 is pressed when processes other than the stencil making process are selected, the processing is switched to the stencil making process. The printing key 31 is a key which switches the processing to the printing process. When the printing key 31 is pressed when processes other than the printing process are selected, the processing is switched to the printing process. The stencil making key 30 and the printing key 31 are arranged in the vicinities of the stencil making block 34 and the printing block 36, respectively, the displays and operations of the respective stencil making and printing are made to correspond to each other, and thus recognitions thereof are facilitated.

The continuation key 32 is a key which switches whether or not the stencil making process and the printing process are to be performed continuously, and for every press thereof, whether or not the stencil making process and the printing process are to be performed continuously is switched. The continuation key 32 is arranged in a neutral position to the stencil making key 30 and the printing key 31 because the continuation key 32 is a key for combining both of the stencil making and the printing.

When the stencil making process and the printing process are performed continuously, the continuation lamp 38 is turned on, the stencil making stop bar 35 is turned off, and the printing stop bar 37 is turned on. On the other hand, when the stencil making process and the printing process are not performed continuously, the continuation lamp 38 is turned off, when only the stencil making process is performed, the stencil making stop bar 35 is turned on, and when only the printing process is performed, the printing stop bar 37 is turned on.

The stencil making block 34 is configured by arraying four LEDs (M1 to M4) in line, and visually displays a progress status of the stencil making process by combinations of turning on and turning off of the respective LEDs. The printing block 36 is configured by arraying four LEDs (P1 to P4) in line, and visually displays a progress status of the printing process by combinations of turning on and turning off of the respective LEDs.

The stencil making stop bar 35 is configured of an LED as a display unit which displays an operation process as to whether or not the operation of the stencil printing machine is to be stopped after the end of the stencil making process. The stencil making stop bar 35 is arranged between the stencil making block 34 and the printing block 36. The stencil making stop bar 35 is turned on in the case of an operation pattern where a first printed sheet is discharged and the operation is stopped after the end of the stencil making.

The printing stop bar 37 is configured of an LED as a display unit which displays an operation process as to whether or not the operation of the stencil printing machine is to be stopped after the end of the printing process. The printing stop bar. 37 is arranged on an end of the printing block 36. The printing stop bar 37 is turned on in the case of an operation pattern where the operation is stopped after the end of the printing (or before the start of the stencil making).

The continuation lamp 38 is arranged in the vicinity of the continuation key 32 such that a relation with the continuation key 32 is easily understood, and displays activation/deactivation of a continuous process of the stencil making process and printing process, which is selectively controlled by the continuation key 32.

Next, display operations of the stencil making block 34 and printing block 36 will be described.

First, the display operations of the LEDs M1 to M4 of the stencil making block 34 will be described.

(Turning Off of All of M1 to M4)

This displays that, when a process other than the stencil making process is selected, the process is not the stencil making process.

(Turning On of All of M1 to M4)

This displays that the stencil making process is selected and the stencil making is enabled. All of the LEDs M1 to M4 are turned on even during the printing in order to explicitly indicate that current printing continues from the stencil making only when the printing is executed in continuation from the stencil making in a state where the continuation key 32 is turned on.

(Blinking of All of M1 to M4)

This displays that the stencil making is to be started based on command/operation of a user in order to distinguish, from normal standby for the stencil making, the case of receiving original data set such that the printing machine is stopped "before stencil making" or "before stencil making, before printing" from a personal computer (PC) and of developing the data. Note that the LED of the start key 33 also blinks in synchronization with the blinks of the LEDs M1 to M4 in this case.

(Individual Turning On of M1 to M4)

The LEDs M1 to M4 included in the stencil making block 34 are sequentially turned on in accordance with the progress of the operation, and display the progress status in the entire operation. Here, only the stencil making block on the head (right side in the drawing) blinks, thus displaying that the operation is going on.

Specifically, a series of the stencil making operation from the start to the end is divided into four subprocesses of Nos. 2 to 5 in FIG. 5, and the display is updated at timing of each event thereof. A blinking speed of the LEDs M1 to M4 during the execution of the stencil making is set constant irrespective of the progress status of the operation.

In FIG. 5, a discharge operation shown in No. 2 in the stencil making process is an operation of housing the used stencil sheet wrapped around the outer peripheral surface of the screen 217 of the printing drum 213 into the stencil disposal box 234. A stencil making preparation operation shown in No. 3 is an operation of moving the tip of the long stencil sheet 208 to a position for thermally perforating by the thermal head 210, and an operation of moving the stencil sheet clamp portion 215 of the printing drum 213 to a position for receiving the tip of the long stencil sheet 208. Operations from the start of the stencil making to cutting of the stencil sheet, which is shown in No. 4, are an operation of thermal perforating by the thermal head 210, a clamp operation for the tip of the long stencil sheet 208 by the stencil sheet clamp portion 215, a wrapping operation for the clamped long stencil sheet 208 around the printing drum 213, and an operation of obtaining the stencil sheet 216 by cutting a rear end of the same stencil sheet 216 in the long stencil sheet 208 wrapped around the printing drum 213 by the stencil sheet cutter. A first printing operation shown in No. 5 is an operation of discharging the first printed sheet for evenly distributing ink to the stencil sheet 216 wrapped around the printing drum 213.

Next, display operations when an error has occurred during the stencil making will be described.

When the stencil printing machine is on standby, the stencil making block 34 that has been turned on at the time when the operation is stopped keeps being turned on while being left as it is. For example, when the operation is stopped at the time when the LEDs M1 and M2 are turned on and the LED M3 blinks, the LEDs M1 and M2 keep being turned on, and the LED M3 is turned off. In such a way, in which state the operation is stopped is explicitly indicated.

When recovery from the error is made, upon completion of recovery preparation, the LED of the start key 33 blinks in a sense of suggesting "press start key 33 to start recovery operation." However, at this point of time, the display of the stencil making block 34 is still the same as that during standby. At the recovery operation, the stencil making block 34 that has been turned on immediately before is displayed in a blinking manner. For example, when the LEDs M1 and M2 have been turned on, the LEDs M1 and M2 blink until the recovery operation is completed. Moreover, when an error has occurred in the subprocess shown by No. 4 in FIG. 5, the process is resumed from the operation of the subprocess shown by No. 4, and shifted to the operation of the subprocess shown by No. 5. Thus, the process is resumed from such a state at the time of an error occurrence. Here, the stencil making process may sometimes be repeated from the start depending on a type of the error.

Next, the display operations of the LEDs P1 to P4 of the printing block 36 will be described.

(Turning Off of All of P1 to P4)

This displays that, when a process other than the printing process is selected, the process is not the printing process.

(Turning On of All of P1 to P4)

This displays that the printing process is selected and the printing is enabled.

(Blinking of All of P1 to P4)

This displays that the command/operation of a user for starting the printing is awaited when the printing machine receives the original data set such that the printing machine is stopped "before printing" or "before stencil making, before printing" from the personal computer, makes the stencil, and is stopped before the printing. In this case, in order to distinguish, from normal standby for the printing, the LED of the start key 33 also blinks in synchronization with the blinks of the LEDs P1 to P4.

(Individual Turning On of P1 to P4)

The LEDs P1 to P4 included in the printing block 36 are sequentially turned on in accordance with the progress of the operation, and display which extent in the entire operation the progress status has reached. Moreover, only the block on the head blinks, thus displaying that the operation is continuing. A printing number entered at the time when the start key 33 is pressed is divided into four numbers of Nos. 2 to 5 in FIG. 6, and the display is updated at each calculated timing.

When the printing is stopped on its way, this timing of the display update is maintained unless a count of the printing number is cleared. When the printing number is cleared, the display is returned to "display of printing enabled (turning on of all of P1 to P4), and the display timing is also reset. A blinking speed of the LEDs P1 to P4 during the execution of the printing is set constant irrespective of the printing speed and number.

Next, display operations when an error has occurred during the printing or when the printing is paused by the stop key 43 will be described.

When the stencil printing machine is on standby, the printing block 36 that has been turned on at the time when the operation is stopped keeps being turned on while being left as it is. For example, when the operation is stopped at the time when the LEDs P1 and P2 are turned on and the LED P3 blinks, the LEDs P1 and P2 keep being turned on, and the LED P3 is turned off. When recovery from the error is made, upon completion of recovery preparation, the LED of the start key 33 blinks in a sense of suggesting "press start key 33 to start recovery operation." However, at this point of time, the display of the printing block 36 is still the same as that during standby. At the recovery operation, the printing block 36 that has been turned on immediately before is displayed in a blinking manner. For example, if the LEDs P1 and P2 have been turned on when the printing is stopped, the LEDs P1 and P2 blink until the recovery operation is completed. Moreover, when an error has occurred in the subprocess of No. 4 in FIG. 6, the process is resumed from the operation of the subprocess of No. 4 after the recovery from the error, and shifted to the operation of the subprocess of No. 5. When the count of the printing number has been cleared, the process is shifted to the turning on of all the LEDs P1 to P4, which indicates "display of printing enabled."

Next, a procedure of basic display operations of the stencil making block 34, the stencil making stop bar 35, the printing block 36 and the printing stop bar 37, which are performed by the control unit 15 based on the program, will be described with reference to an operation flowchart shown in FIG. 7.

Figure 7:
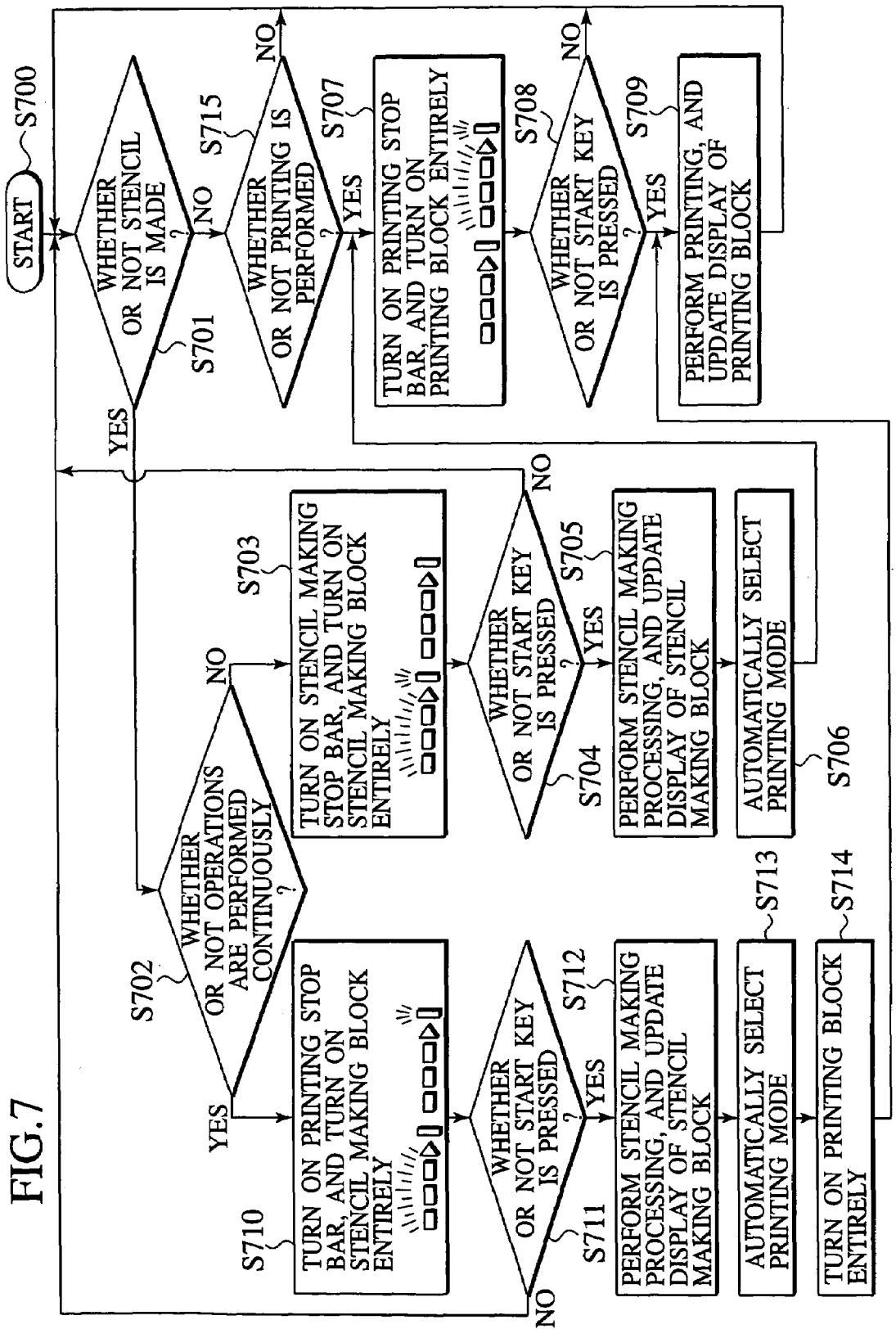
FIG. 7 is a flowchart showing a procedure of basic display operations of the first embodiment of the present invention.

In FIG. 7, it is first determined whether or not a stencil making operation is performed (Step S701). When the stencil making operation is performed, it is determined whether or not a printing operation is performed continuously with the stencil making operation (Step S702). When the printing operation is not performed continuously as a result of the determination, the stencil making stop bar 35 is turned on, and the LEDs M1 to M4 of the stencil making block 34 are turned on (Step S703). Thereafter, it is determined whether or not the start key 33 is pressed (Step S704). When the start key 33 is not pressed, the processing returns to the start (Step S700). When the start key 33 is pressed, the stencil making processing is started, and the displays of the respective LEDs M1 to M4 of the stencil making block 34 are updated in accordance with the progress status of the stencil making processing as shown in FIG. 5 (Step S705).

Next, a printing mode is selected automatically (Step S706). Thus, the printing stop bar 37 is turned on, and all of the LEDs P1 to P4 of the printing block 36 are turned on (Step S707). Thereafter, it is determined whether or not the start key 33 is pressed (Step S708). When the start key 33 is not pressed, the processing returns to the start (Step S700). When the start key 33 is pressed, the printing processing is started, and the displays of the respective LEDs P1 to P4 of the printing block 36 are updated in accordance with the progress status of the printing processing as shown in FIG. 6 (Step S709).

Meanwhile, when the stencil making operation and the printing operation are performed continuously as a result of the determination in Step S702, the printing stop bar 37 is turned on, and all of the LEDs M1 to M4 of the stencil making block 34 are turned on (Step S710). Thereafter, it is determined whether or not the start key 33 is pressed (Step S711). When the start key 33 is not pressed, the processing returns to the start (Step S700). When the start key 33 is pressed, the stencil making processing is started, and the displays of the respective LEDs M1 to M4 of the stencil making block 34 are updated in accordance with the progress status of the stencil making processing as shown in FIG. 6 (Step S712). Next, the printing mode is selected automatically (Step S713), and thus all of the LEDs P1 to P4 of the printing block 36 are turned on (Step S714), and the processing in Step S709 is performed.

Meanwhile, when the stencil making operation is not performed as a result of the determination of Step S701, it is subsequently determined whether or not the printing operation is performed (Step S715). When the printing operation is not performed, the processing returns to the start (Step S700). When the printing processing is performed, the operation of Step S707 and operations subsequent thereto are performed.

In the first embodiment of the present invention, which is as described above, when the stencil printing machine is stopped, the stencil making block 34, the stencil making stop bar 35, the printing block 36 and the printing stop bar 37 are arranged in a manner of imitating an operation flowchart thereof, and thus a time-line connection thereof is expressed. In such a way, even a user who does not know in detail a concept peculiar to the stencil printing, which is the stencil making and the printing, can grasp a flow of the operations visually at a glance. In addition, together with the above, information as to "when the printing machine is to be stopped" meaning "stopped after the stencil making and before the printing," "stopped after the printing" and the like is visually indicated explicitly by means of patterns of turning on and off the stencil making stop bar 35 and the printing stop bar 37. Thus, a user can grasp the flow of the operations more specifically. In such a way, a user can change operation patterns by operating the variety of keys arranged in combination with the display unit 14 while visually confirming the flow of operations as described above. Therefore, an instinctive operation can be realized.

Moreover, when the stencil printing machine is operated, the display unit 14 dynamically expresses the processes under progress by combinations of the turning on and off of the block and bars; accordingly, it becomes easy to visually grasp the progress status of the work process. Furthermore, while the display unit 14 for the printing number counts the number of residual sheets, the display unit for the printing process displays "which amount remains in the whole amount of work in terms of ratio till the end of the work." Accordingly, it becomes easy to predict an ending time of the work more instinctively, a user is released from restraint to the machine, and thus work efficiency is improved.

Moreover, when the operation of the printing machine is interrupted, "state when operation is interrupted" is displayed during the interruption of the operation; accordingly, it becomes easy to grasp when the operation is interrupted. For example, in the case where the stencil printing machine is stopped due to some trouble during the operation of the stencil making, when the stencil printing machine is stopped in a state where the two LEDs M1 and M2 among the four LEDs M1 to M4 are turned on, it can be determined that operations up to the stencil making preparation operation have been normally ended and that a trouble has occurred between the start of the stencil making and the cutting of the stencil. Thus, troubles can be dealt with easily.

Meanwhile, when the stencil printing machine is in a standby state for the command of a user and set not to start the operations until the user presses the start key 33, the display unit for the work processes and the LED of the start key 33 are blinked in synchronization with each other. Thus, the user can easily recognize operations to be performed thereby in association with the display. As described above, the display unit for the work process and the other display units are operated in association with each other, thus enabling broad expressions in conjunction with other functions.

Moreover, unlike a copier which does not prepare the stencil, in the case of performing printing by the stencil printing machine, two processes that are the stencil making and the printing are required. Specifically, the stencil printing machine cannot perform the printing without making the stencil, but can perform the printing repeatedly by use of the stencil once made, and such concepts peculiar to the stencil printing machine are unfamiliar to general users. Accordingly, a display mode which helps the general users visually understand these concepts is provided, thus making it possible to contribute to an improvement in ease of use of the device for users who are not accustomed to the use.

Furthermore, also for users who are accustomed to the use, the fact that an operation pattern can be selected among the diversified operation patterns prepared by combining the processes of the stencil making and printing while being visually confirmed can contribute to prevention of an operation mistake and the improvement of the work efficiency. Moreover, when an error has occurred, at which step a malfunction has occurred can be assumed based on the display on the display unit; accordingly, this can also contribute to an improvement of maintainability.

Note that it is also possible to express operations other than the above in accordance with functions provided in the stencil printing machine. For example, in a stencil printing machine provided with operational functions other than the stencil making and the printing, which are, for example, an output of data to external equipment and a receipt of data from a scanner, all of the LEDs of the stencil making block 34 and the printing block 36 are turned off, thus making it possible to explicitly indicate that a current operation is not included in the stencil making or the printing. Moreover, during a confidential operation of wrapping an unprocessed stencil sheet around the printing drum 213 for securing confidentiality, a turning on spot of the stencil making block 34 is shifted (repeatedly from left to right), thus making it also possible to express continuation of the operation irrespective of a degree of progress.

Moreover, it is possible to make a display of more detailed information and a display guiding the operation of a user by combining the above-described display operations with other display devices such as a sheet counter (7 segment LED) and an LCD panel. Examples of the combinations are shown below.

Example of Combination with Start Key 33

During standby for the stencil making of data received from the personal computer, the LEDs of the stencil making block 34 and start key 33 are blinked in conjunction with each other. Thus, even in a stencil printing machine which is not provided with the LCD panel, it is made possible to explicitly guide an operation for the start of the stencil making by the press of the start key 33, in which "what is being awaited" and "which key is to be pressed as the next operation" are indicated to a user.

Example of Combination with Sheet Counter

For example, when an error has occurred, "in which process the error has occurred" is displayed in the stencil making block 34 and the printing block 36, and the contents of the error are displayed by a letter or a diagram on the sheet counter (7 segment LED). Thus, even in the stencil making machine which is not provided with the LCD panel, it is possible to express more detailed information than that on a display only by the conventional sheet counter.

Example of Combination with LCD Panel

In a stencil printing machine provided with the LCD panel, when the stencil making and printing keys are pressed, a screen of the LCD panel is switched to a display in response to each process; accordingly, the stencil making and printing keys can be utilized as "shortcut keys for screen switching."

Moreover, in the stencil making machine provided with the operational functions other than the stencil making and the printing (output of data to external equipment, receipt of data from a scanner and the like), the stencil making and printing keys can also be utilized as "shortcut keys for switching other operational functions to stencil making and printing processes." For example, on the screen of the LCD panel, in such a case where a user enters a deep hierarchy in menu items by an operation for selecting the menu items and loses him/herself therein, the stencil making key is pressed, thus making it possible to return to a basic screen for the stencil making. As described above, the stencil making and printing keys can also be used as "means for returning to basic screen when one loses his/her way."

Moreover, while the LCD panel simply displays "current setting," the stencil making and printing blocks visually display "current position in work process from stencil making to printing." Accordingly, a user can grasp the status more concretely by viewing information from the both.

Figure 8:
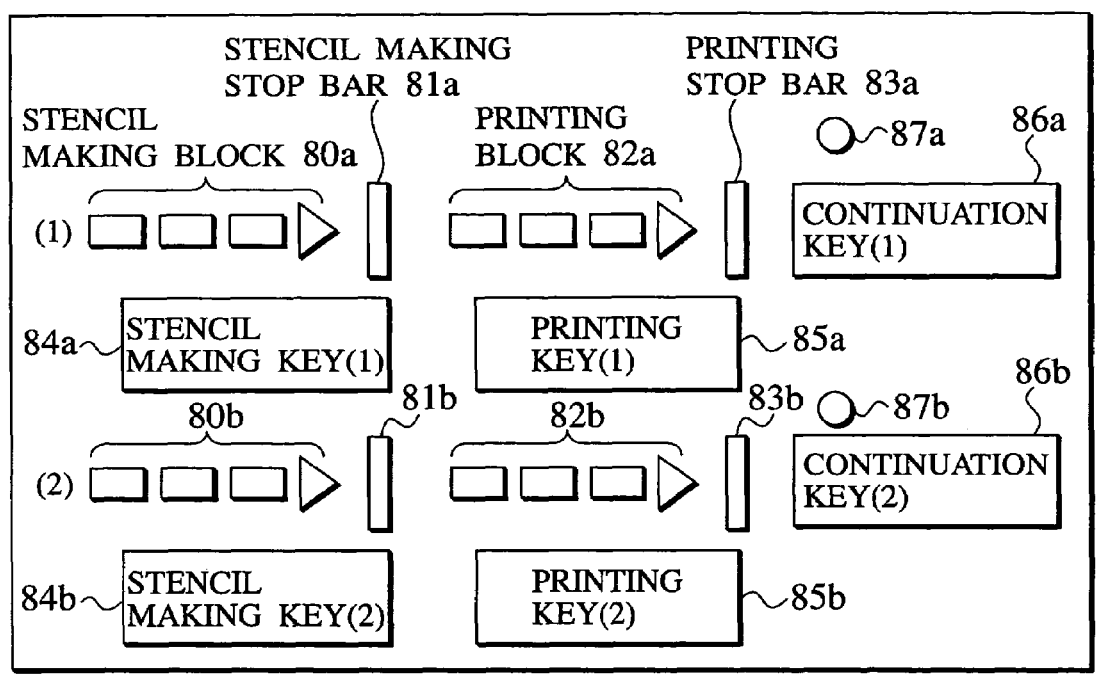
FIG. 8 is a view showing a configuration of an operation/display panel of a second embodiment of the present invention.

FIG. 8 is a view showing configurations of the operation unit 13 and display unit 14 when a process progress display device according to a second embodiment of the present invention is applied to a stencil printing machine having a plurality of printing drums. Note that the entire configuration of the stencil printing machine is substantially the same as that shown in FIGS. 1 and 2 except for including the plurality of printing drums.

In FIG. 8, a stencil printing machine, for example, having two printing drums, is configured by including, as the display unit 14, stencil making blocks 80a and 80b, stencil making stop bars 81a and 81b, printing blocks 82a and 82b, and printing stop bars 83a and 83b for the respective printing drums, these components being similar to those shown in FIG. 3. The stencil printing machine is also configured by including, as the operation unit 13, stencil making keys 84a and 84b, printing keys 85a and 85b, continuation keys 86a and 86b, and continuation lamps 87a and 87b for the respective printing drums, these components being similar to those shown in FIG. 3.

For example, in the stencil printing machine having the two printing drums, it can be selected whether two-color printed matter is obtained by performing printing operations simultaneously by the two printing drums or single-color printed matter is obtained by performing a printing operation only by one of the two printing drums. Moreover, a variety of work processes can be utilized in combination. For example, newly combined printed matter can be obtained by leaving a stencil on one of the printing drums as it is and changing a stencil on the other.

In the configuration example shown in FIG. 8, the operations of the first printing drum are displayed on a block group shown by (1), and the operations of the second printing drum are displayed on a block group shown by (2). In order to designate which work process is to be performed, the stencil making keys 84a and 84b and the printing keys 85a and 85b, which are arranged immediately under the respective blocks, are pressed. The stencil making stop bars 81a and 81b and the printing stop bar 83a and 83b are turned on when the corresponding stencil making keys 84a and 84b and printing keys 85a and 85b are pressed once, and when these keys are pressed again, these bars are turned off.

In the above-described configuration, the work processes are designated in such a manner as described below.

When the stencil making and the printing are performed only by the first printing drum (second printing drum is not operated), the continuation key 86a of the block group (1) is pressed to turn on only the printing stop bar 83a of the block group (1). The stencil making key 84b and printing key 85b of the block group (2) are pressed to turn off the stencil making stop bar 81b and printing stop bar 83b of the block group (2).

When the stencil making is performed by both of the first and second printing drums and the operations are stopped without the printing, the stencil making keys 84a and 84b of the block groups (1) and (2) are pressed to turn on the stencil making stop bars 81a and 81b of the block groups (1) and (2).

When the stencil making is performed only by the first printing drum and the printing is performed simultaneously with the second printing drum where the stencil making has already been performed, the continuation key 86a of the block group (1) is pressed to turn on only the printing stop bar 83a of the block group (1), and the printing key 85b of the block group (2) is pressed to turn on the printing stop bar 83b of the block group (2).

Note that a display of a progress status of each work process is similar to that in the precedent first embodiment. Moreover, the display unit and the operation unit, which include the stencil making blocks, the stencil making stop bars, the printing blocks, the printing stop bars, the stencil making keys, the printing keys, the continuation keys, and the continuation lamps, may be configured into one set as shown in FIG. 3, and by a selector switch or on the screen of the LCD operation panel, the display unit and the operation unit may be switched so as to correspond to the plurality of printing drums.

As described above, in the above-described second embodiment, effects similar to those of the precedent first embodiment can be obtained, and it is made possible to clearly display and control complicated combinations of the processes in the plurality of printing drums.

Figure 9:
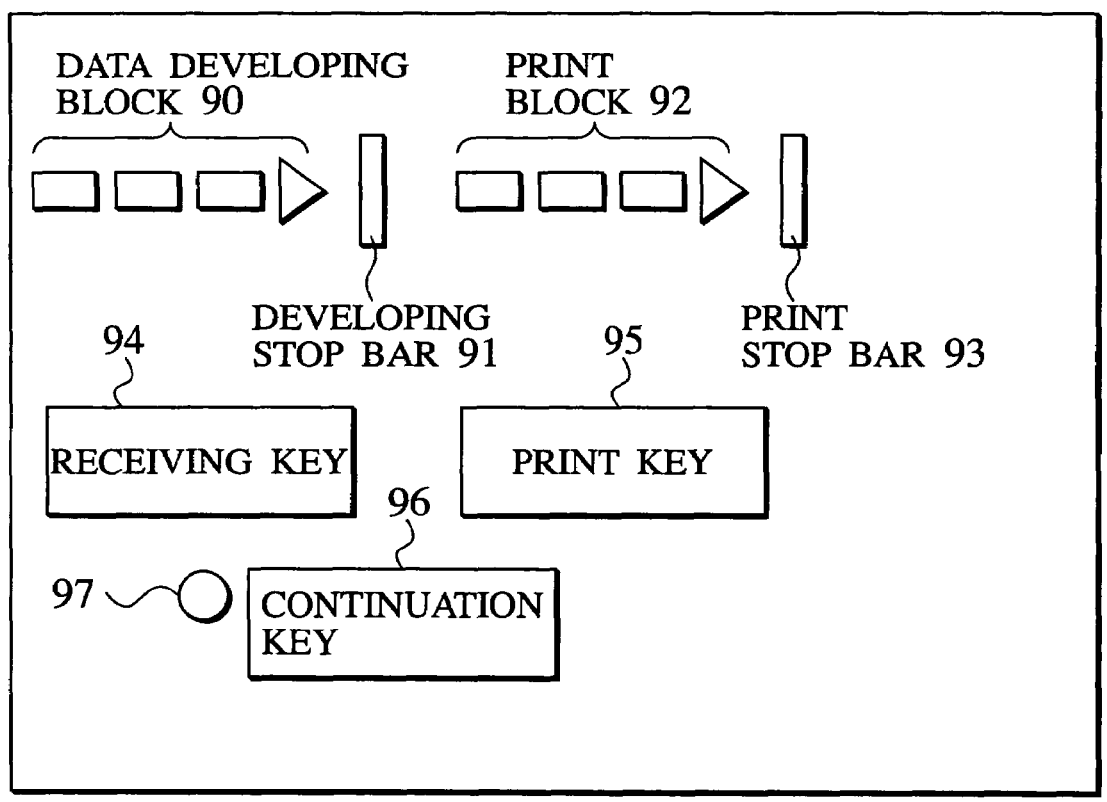
FIG. 9 is a view showing a configuration of an operation/display panel of a third embodiment of the present invention.

FIG. 9 is a view showing configurations of an operation unit and a display unit when a process progress display device according to a third embodiment of the present invention is applied to an image forming apparatus such as a copier and a printer. The operation unit and the display unit are controlled by a control unit similar to that shown in FIG. 1, where display processing described below is performed.

In FIG. 9, the operation unit and the display unit are configured by including a data developing block 90 which indicates a work process of receiving data from outside and developing the same, a developing stop bar 91 which is turned on when the processes are stopped after completing a developing work process, a print block 92 which indicates a printing work process, a print stop bar 93 which is turned on when the processes are stopped after completing a printing work process, a receiving key 94 which switches the processes to a process of receiving and developing data, a print key 95 which switches the processes to a printing work process, a continuation key 96 which switches whether or not the developing and the printing are performed continuously, and a continuation lamp 97 which is turned on when the receiving and developing of the data and the printing are performed continuously.

In the above-described configuration, it can be selected whether the work process of developing the data received from the outside and storing the data in a storage device (data developing block) and the work process of printing the data (printing block), the work processes being plural, are to be performed individually or continuously. Moreover, a progress status of the data developing is displayed by four LEDs of the data developing block 90, and a progress status of the printing is displayed by four LEDs of the printing block 92.

In the third embodiment as described above, in a flow of the continuous plurality of work processes in the image forming apparatus, it is made possible to visually grasp to which work process the processes are to be performed and grasp the progress status of the work processes. In such a way, the operationality and work efficiency of the image forming apparatus can be improved.

Figure 10:
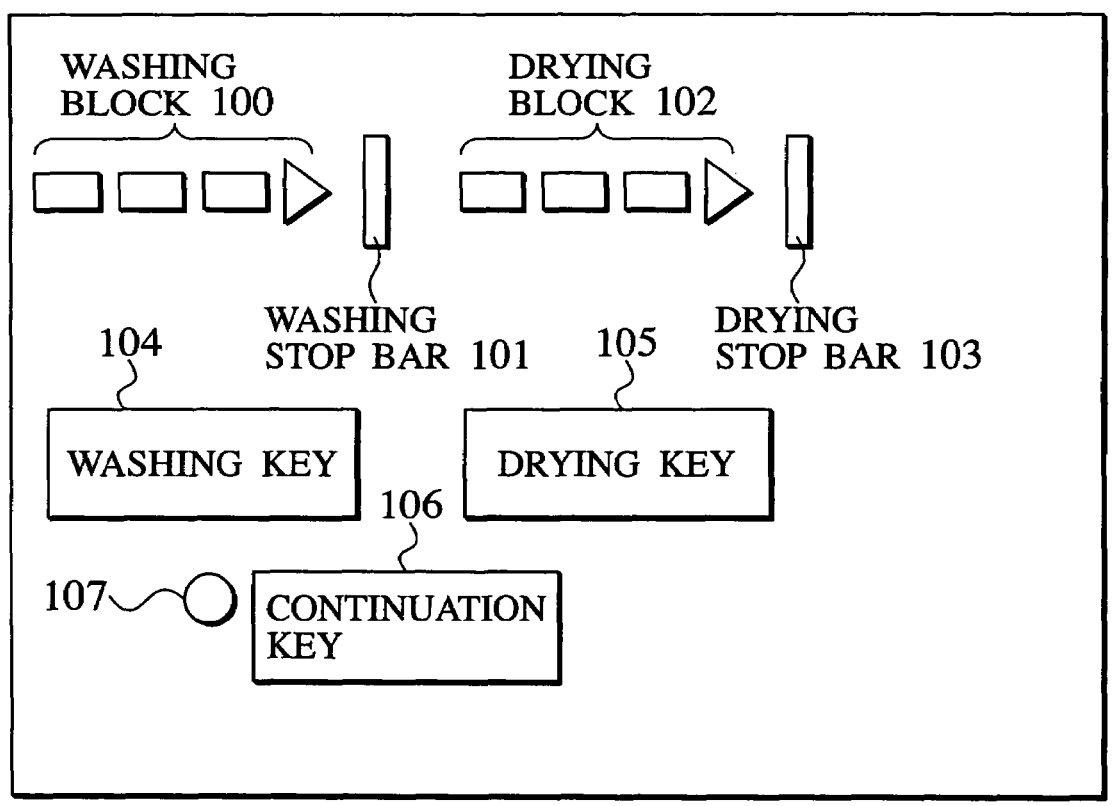
FIG. 10 is a view showing a configuration of an operation/display panel of a fourth embodiment of the present invention.

FIG. 10 is a view showing configurations of an operation unit and a display unit when a process progress display device according to a fourth embodiment of the present invention is applied to a washing machine having a plurality of work processes. The operation unit and the display unit are controlled by a control unit similar to that shown in FIG. 1, in which display processing shown below is performed.

In FIG. 10, the operation unit and the display unit are configured by including a washing block 100 which indicates a work process of water injection to a washing tub, washing, rinsing, dewatering, a washing stop bar 101 which is turned on when the washing work process is stopped after being completed, a drying block 102 which indicates a drying work process for the washing, a drying stop bar 103 which is turned on when the drying work process is stopped after being completed, a washing key 104 which switches processing to the washing work process, a drying key 105 which switches the processing to the drying work process, a continuation key 106 which switches whether or not the washing and the drying are performed continuously, and a continuation lamp 107 which is turned on when the washing and the drying are performed continuously.

In the above-described configuration, it can be selected whether the washing work process (washing block) and the drying work process for the washing (drying block), the work processes being plural, are to be performed individually or continuously. Moreover, the progress status of the washing (water injection, washing, rinsing, and dewatering) are displayed by four LEDs of the washing block 100 and the progress status of the drying (drying time) is displayed by four LEDs of the drying block 102.

In the fourth embodiment as described above, in a flow of the continuous work processes in the washing machine, which have two work processes of washing and drying, it is made possible to visually grasp to which work process the processing is to be performed and grasp the progress status of the work processes. In such a way, the operationality and work efficiency of the washing machine can be improved.

Figure 11:
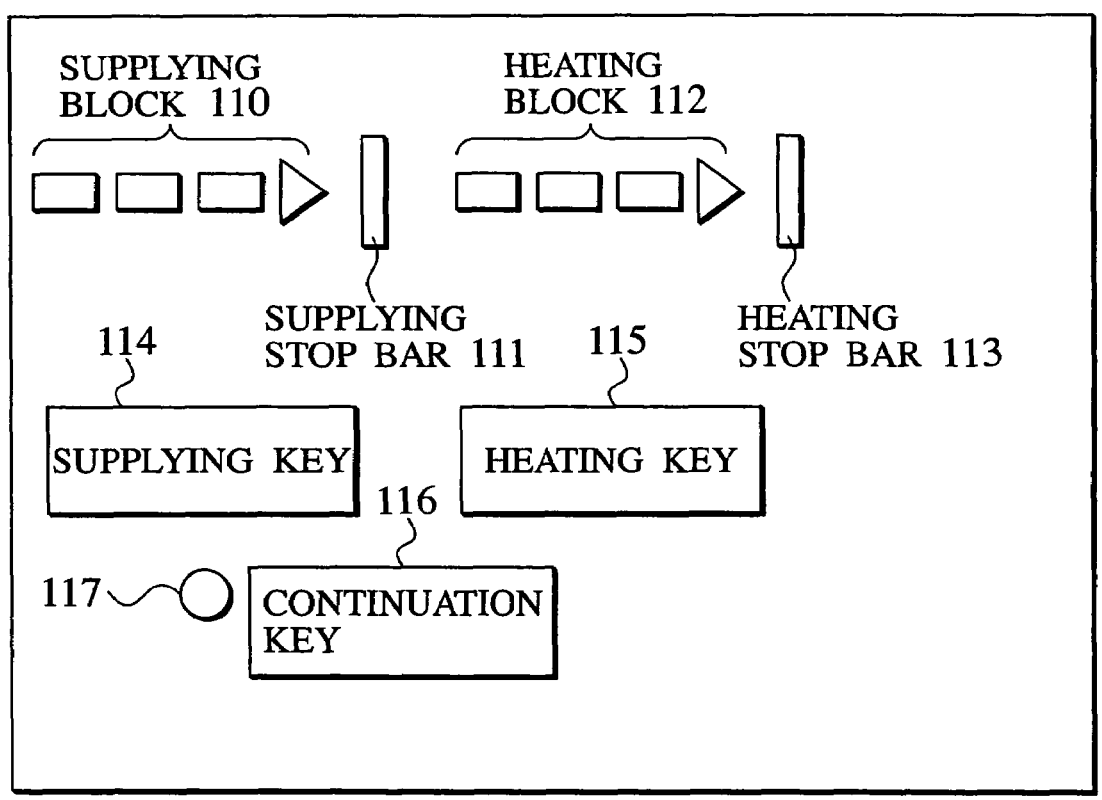
FIG. 11 is a view showing a configuration of an operation/display panel of a fifth embodiment of the present invention.

FIG. 11 is a view showing configurations of an operation unit and a display unit when a process progress display device according to a fifth embodiment of the present invention is applied to a bath water heater having a plurality of work processes. The operation unit and the display unit are controlled by a control unit similar to that shown in FIG. 1, in which display processing shown below is performed.

In FIG. 11, the operation unit and the display unit are configured by including a supplying block 100 which indicates a work process of supplying water to a predetermined level of a bath tub, a supplying stop bar 111 which is turned on when the supplying work process is stopped after being completed, a heating block 112 which indicates a heating work process of heating water supplied to the bath tub to a designated temperature, a heating stop bar 113 which is turned on when the heating work process is stopped after being completed, a supplying key 114 which switches processing to the supplying work process, a heating key 115 which switches the processing to the heating work process, a continuation key 116 which switches whether or not the supplying and the heating are performed continuously, and a continuation lamp 117 which is turned on when the supplying and the heating are performed continuously.

In the above-described configuration, it can be selected whether the supplying work process (supplying block) and the heating work process (heating block), the work processes being plural, are to be performed individually or continuously. Moreover, the progress status of the supplying (ratio to a preset water amount) is displayed by four LEDs of the supplying block 110, and the progress status of the heating (ratio to a preset heating temperature) is displayed by four LEDs of the heating block 112.

In the fifth embodiment as described above, in a flow of the continuous work processes in the bath water heater, which have two work processes of supplying and heating, it is made possible to visually grasp to which work process the processing is to be performed and grasp the progress status of the work processes. In such a way, the operationality and work efficiency of the bath water heater can be improved.

What is claimed is:

1. A stencil printer, the stencil printer comprising:
a stencil making unit;
a printing unit; and
a process progress display device displaying progress status of a plurality of work processes, wherein at least two of the work processes includes operations distinct from a different one of the work processes and which are performed in a processing apparatus individually or continuously, the process progress display device comprising:
a work process progress display unit having a first and a second array of light emitting diodes, each configured to display a progress status of each work process by combinations of turning on and turning off the respective light emitting diodes in correspondence with a percentage of work completed in each process, wherein at least one work process is different from another work process;
a work process stop display unit corresponding to each work process, making a display as to whether the processing apparatus is to be stopped or a work process scheduled to be subsequently performed is to be continuously executed in accordance with a work process to be executed at an end of the work process, wherein the work process stop display unit dynamically expresses the work processes under progress by combinations of one of stop status and continuous status; and
a control unit configured to control contents of the display of the work process progress display unit in accordance with the progress status of each work process and sequentially updates the contents of the display on the work process progress display unit, wherein the control unit selects at least one work process as an automatic default,
wherein at least one of said at least two of the work processes includes a stencil making process of stencil making based on data received and a printing process of printing the data developed in the stencil making process.

2. The process progress display device according to claim 1, wherein the work process progress display unit and the work process stop display unit make a display in association with another display unit.

3. The process progress display device according to claim 2, wherein the another display unit comprises a start key to start processing upon being pressed, wherein the start key lights to indicate that it is possible to start the processing displayed on the work process progress display unit and the work process stop display unit, the start key blinks to indicate that a start command for the processing is required, and the start key un-lights to indicate that it is impossible to start the processing.

4. The process progress display device according to claim 1, wherein the process progress display device is included in a stencil printing machine including a stencil making process of perforating a stencil sheet based on image information and a printing process of performing stencil printing on a printing medium by use of the stencil sheet for which the stencil making has already been performed, and displays the progress statuses of the stencil making process and the printing process.

5. The process progress display device according to claim 4, wherein the stencil printing machine includes a plurality of printing drums, and performs the stencil printing independently for each of the printing drums, and the process progress display device displays the progress statuses of the stencil making process and the printing process for each of the printing drums.

6. The process progress display device according to claim 1, wherein the process progress display device is included in an image forming apparatus including a developing process of developing and storing data received from outside and a printing process of printing the data developed and stored in the developing process, and displays progress statuses of the developing process and the printing process.

7. The process progress display device according to claim 2, wherein the process progress display device is included in a stencil printing machine including a stencil making process of perforating a stencil sheet based on image information and a printing process of performing stencil printing on a printing medium by use of the stencil sheet for which the stencil making has already been performed, and displays the progress statuses of the stencil making process and the printing process.

8. The process progress display device according to claim 7, wherein the stencil printing machine includes a plurality of printing drums, and performs the stencil printing independently for each of the printing drums, and the process progress display device displays the progress statuses of the stencil making process and the printing process for each of the printing drums.

9. The process progress display device according to claim 3, wherein the process progress display device is included in a stencil printing machine including a stencil making process of perforating a stencil sheet based on image information and a printing process of performing stencil printing on a printing medium by use of the stencil sheet for which the stencil making has already been performed, and displays the progress statuses of the stencil making process and the printing process.

10. The process progress display device according to claim 9, wherein the stencil printing machine includes a plurality of printing drums, and performs the stencil printing independently for each of the printing drums, and the process progress display device displays the progress statuses of the stencil making process and the printing process for each of the printing drums.

11. The process progress display device according to claim 2, wherein the process progress display device is included in an image forming apparatus including a developing process of developing and storing data received from outside and a printing process of printing the data developed and stored in the developing process, and displays progress statuses of the developing process and the printing process.

12. The process progress display device according to claim 3, wherein the process progress display device is included in an image forming apparatus including a developing process of developing and storing data received from outside and a printing process of printing the data developed and stored in the developing process, and displays progress statuses of the developing process and the printing process.

13. Method of displaying progress status of a plurality of work processes including at least one printing process and one stencil making process of a stencil printer, the printing process involving a printer unit and the stencil making process involving a stencil making unit, wherein at least two of the work processes includes operations distinct from a different one of the work processes performed in a processing apparatus individually or continuously, the method comprising:

displaying a progress status of each of said distinct work process;

for each of said distinct work processes providing a display as to stopping the processing apparatus or continuing execution of a work process in accordance with a work process to be executed at an end of a prior work process, wherein the work process stop display dynamically expresses the work processes under progress by combinations of one of stop status and continuous status in a first and a second array of light emitting diodes, each configured to display a progress status of each work process by combinations of turning on and turning off the respective light emitting diodes in correspondence with a percentage of work completed in each process; and controlling contents of the display of the work process progress display in accordance with the progress status of each work process and sequentially updating the contents of the display on the work process progress display so as to automatically select at least one work process, wherein at least one of said at least two of the work processes includes a stencil making process of stencil making based on data received and a printing process of printing the data developed in the stencil making process.

14. The method according to claim 13, wherein the process progress display includes displays concerning a stencil making process of perforating a stencil sheet based on image information and further includes displays concerning a printing process of performing stencil printing on a printing medium by use of the stencil sheet for which the stencil making previously performed, and displays the progress statuses of the stencil making process and the printing process.

15. The method according to claim 13, wherein the process progress display provides display concerning an image forming apparatus including a developing process of developing and storing data received from outside and a printing process of printing the data developed and stored in the developing process, and displays progress statuses of the developing process and the printing process.

16. A stencil printer, the stencil printer comprising:
a stencil making unit;
a printing unit; and
a process progress display device displaying progress status of a plurality of work processes, wherein at least two of the work processes includes operations distinct from a different one of the work processes and which are performed in a processing apparatus individually or continuously, the process progress display device comprising:

a work process progress display unit configured to display a process status of each work process simultaneously, wherein at least one work process is different from another work process;

a work process stop display unit corresponding to each work process, making a display as to whether the processing apparatus is to be stopped or a work process scheduled to be subsequently performed is to be continuously executed in accordance with a work process to be executed at an end of the work process, wherein the work process stop display unit dynamically expresses the work processes under progress by combinations of one of stop status and continuous status in a work process display unit having a first and a second array of light emitting diodes, each configured to display a progress status of each work process by combinations of turning on and turning off the respective light emitting diodes in correspondence with a percentage of work completed in each process; and a control unit configured to control contents of the display of the work process progress display unit in accordance with the progress status of each work process and sequentially updates the contents of the display on the work process progress display unit, wherein the control unit selects at least one work process as an automatic default, wherein at least one of said at least two of the work processes includes a stencil making process of stencil making based on data received and a printing process of printing the data developed in the stencil making process.

17. Method of displaying progress status of a plurality of work processes including at least one printing process and one stencil making process of a stencil printer, the printing process involving a printer unit and the stencil making process involving a stencil making unit, wherein at least two of the work processes includes operations distinct from a different one of the work processes performed in a processing apparatus individually or continuously, the method comprising:

displaying a progress status of each of said distinct work processes simultaneously;

for each of said distinct work processes providing a display as to stopping the processing apparatus or continuing execution of a work process in accordance with a work process to be executed at an end of a prior work process, wherein the work process stop display dynamically expresses the work processes under progress by combinations of one of stop status and continuous status in a work process display unit having a first and a second array of light emitting diodes, each configured to display a progress status of each work process by combinations of turning on and turning off the respective light emitting diodes in correspondence with a percentage of work completed in each process; and controlling contents of the display of the work process progress display in accordance with the progress status of each work process and sequentially updating the contents of the display on the work process progress display, so as to automatically select at least one work process, wherein at least one of said at least two of the work processes includes a stencil making process of stencil making based on data received and a printing process of printing the data developed in the stencil making process.

* * * * *